Figure 1:
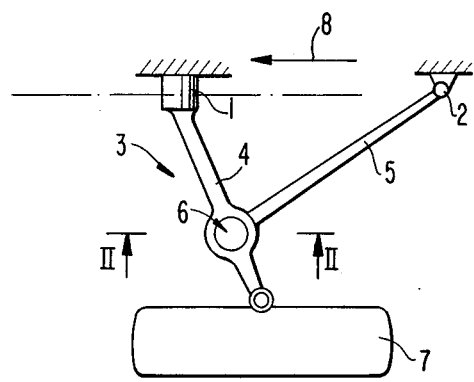

United States Patent [19]

Kleinschmit et al.

[11] 4,030,714
[45] June 21, 1977

[54] CONNECTING ELEMENT FOR WHEEL SUSPENSIONS OF MOTOR VEHICLES

[75] Inventors: Einhard Kleinschmit, Esslingen-Hegensberg; Peter Tattermusch, Obersulm; Günther Haverbeck, Plochingen, all of Germany

[73] Assignee: Daimler-Benz Aktiengesellschaft, Germany

[22] Filed: June 21, 1976

[21] Appl. No.: 698,081

[30] Foreign Application Priority Data

June 20, 1975 Germany ............ 2527408

[52] U.S. Cl. .......... 267/21 A; 267/57.1 A; 280/717; 280/695
[51] Int. Cl.² ................................. B66G 11/24
[58] Field of Search ......... 267/21 A, 21 R, 57.1 R, 267/57.1 A; 280/717, 695

[56] References Cited

UNITED STATES PATENTS 3,484,063  12/1969  Peirce .................. 267/21 R

FOREIGN PATENTS OR APPLICATIONS 745,508  11/1966  Canada .................. 267/21 A Primary Examiner—James B. Marbert
Attorney, Agent, or Firm—Craig & Antonelli

[57] ABSTRACT

A connecting element for wheel suspensions of motor vehicles which is arranged between a cross guide member and a support rod; the connecting element includes a clamping bolt approximately perpendicular to the axes of the support rod and of the cross guide member and two clamping cones whereby the end of the support rod traversed by the clamping bolt is disposed between the clamping cones; the clamping cones are supported with their outer surfaces each by way of an elastic intermediate layer at the corresponding cone surfaces of a mounting opening provided in the cross guide member.

10 Claims, 2 Drawing Figures

CONNECTING ELEMENT FOR WHEEL SUSPENSIONS OF MOTOR VEHICLES

The present invention relates to a connecting element for wheel suspensions of motor vehicles, especially to a connecting element which is provided between the cross guide member of a wheel guide means and a support rod arranged to the rear of the cross guide member in relation to the vehicle longitudinal direction and which is disposed approximately to the point of intersection of the axes determined by the point of pivotal connections of the cross guide member and of the support rod.

In wheel suspensions, for which such connecting elements are provided in particular, the cross guide member together with the support rod represents an arrangement, in which the support rod is stressed in compression and in which a free moment of not accurately reproducable magnitude acts on the cross guide member. Furthermore, the angle between the cross guide member and the support rod must be variable as a result of longitudinal displacements or movements of the wheel connected with the cross guide member by way of a wheel carrier.

Owing to these and other conditions which are made of a connecting element in such application, there results the requirement in relation to such a connecting element that it is suitable to fulfill the function of a hinge in conjunction with a low and light-weight construction. In addition thereto, the force introduction of longitudinal forces acting on the cross guide member into the support rod which are to be absorbed by way of the support rod is to take place in the direction of the longitudinal axis thereof determined by its point of pivotal connection in order that the system be able to center itself also under load. This, of course, also requires that movements of the support rod perpendicularly to the cross guide member plane are suppressed. Furthermore, the transmission of noises is to be additionally prevented by such a connecting element and a simple assembly with simple manufacture is to be assured.

A connecting element of the aforementioned type in its construction according to the present invention satisfies these requirements, in which it is characterized in that it includes a clamping bolt disposed approximately perpendicularly to the axes of the support rod and of the cross guide member and two clamping cons, between which is located the corresponding end of the support rod traversed by the clamping bolt, whereby the clamping cones are supported with their outer surfaces respectively by way of an elastic intermediate layer at corresponding cone surfaces of a mounting opening of the cross guide member.

With such a construction according to the present invention, however, not only the aforementioned requirements are fulfilled but therebeyond also contortions and seizings of a shock absorber supported on the cross guide member are prevented which might occur during a tilting of the cross guide member. Furthermore, the construction in accordance with the present invention enables a particularly simple assembly of the connecting element in the manner of a plug-in construction, whence, in addition to a good assembling ability, a favorable utilization of the material in the corresponding portions of the cross guide member can be attained.

It is appropriate in the realization of the present invention if a tight-fit bolt is used as clamping bolt so that a clearance-free or play-free connection of the support rod traversed by the tight-fit bolt with the two clamping cons is possible which, in their turn, are supported by way of a preferably annularly shaped elastic intermediate layer on the corresponding cone surfaces of the mounting opening of the cross guide member, into which projects the support rod by way of a lateral insert opening in the cross guide member. Appropriately, at least one conically shaped sheet metal insert is provided in the elastic intermediate layers preferably constructed cone-shaped in adaptation to the mounting opening, and more particularly is vulcanized-in into the elastic intermediate layers in order to achieve as large as possible a difference between radial spring softness and torsional rigidity and in order to reduce transverse stresses in the elastic intermediate layer.

By reason of the fact that within the scope of the solution of the present invetion, the largest diameter of a clamping cone is larger than the smallest diameter of the mounting opening, it is additionally also assured that, for example, in case of a destruction of the elastic intermediate layer no clearance or play results between the cross guide member and the support rod, that may impair the safety. This is so as a form-locking connection is achieved by such a construction, which also under such extreme conditions still assures a sufficiently accurate guidance. Finally, it can additionally be achieved by such a special construction that the connecting element acts as noise filter with respect to a predetermined frequency band.

Accordingly, it is an object of the present invention to provide a connecting element for wheel suspensions of motor vehicles which avoids by simple means the aforementioned shortcomings and drawbacks encountered in the prior art.

Another object of the present invention resides in a connecting element for wheel suspensions of motor vehicles which is capable to fulfill the function of a hinge of relatively low dimensions.

A further object of the present invention resides in a connecting element for wheel suspensions of motor vehicles which consists of relatively few parts that can be easily manufactured and assembled.

Still a further object of the present invention resides in a connecting element for wheel suspensions of motor vehicles which assures proper introduction of the forces into the support rod in such a manner that a self-centering of the system under load is assured.

Another object of the present invention resides in a connecting element of the type described above which assures a simple assembly in conjunction with simple manufacture of the various parts thereof.

A further object of the present invention resides in a connecting element for wheel suspensions of motor vehicles which not only prevents the transmission of noises but also minimizes stresses in parts supported on the cross guide members, such as the shock absorbers.

Still a further object of the present invention resides in a connecting element of the type described above which clearly differentiates between radial spring softness and torsional rigidity, yet precludes play impairing the safety of the wheel suspension in case of wear or detruction of the elastic intermediate layer used in the connecting element.

Figure 2:
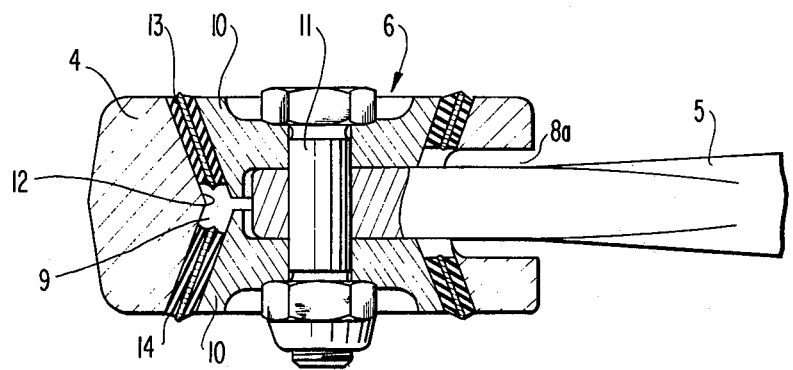

These and other objects, features and advantages of the present invention will become more apparent from the following description when taken in connection with the accompanying drawing which shows, for purposes of illustration only, one embodiment in accordance with the present invention, and wherein:

FIG. 1 is a schematic plan view of a wheel guide structure of a vehicle assembled of a cross guide member and of a support rod, whereby only the points of pivotal connection at the vehicle and the point of pivotal connection at the wheel carrier as well as the associated wheel are indicated in outline, and FIG. 2 is a cross-sectional view, on an enlarged scale, of the connection between the cross guide member and the support rod, taken along line II—II of FIG. 1.

Referring now to the drawing wherein like reference numerals are used throughout the two views to designate like parts, and more particularly to the top plan view illustrated in FIG. 1 of the body of a vehicle, only the points of pivotal connection designated by reference numerals 1 and 2 of a wheel guide structure generally designated by reference numeral 3 are shown. The wheel guide structure 3 consists of a cross guide member 4 coordinated to the point of pivotal connection 1 and of a support rod 5 retained in the point of pivotal connection 2, whereby the cross guide member 4 and the support rod 5 are pivotally connected with one another by way of a connecting member generally designated by reference numeral 6 and whereby additionally only the cross guide member 4 is connected in its outer end with a wheel carrier, not shown in detail, for a wheel 7. In relation to the driving direction indicated by arrow 8, the points of pivotal connection 1 and 2 are located in plan view essentially on a straight line extending in the driving direction, which forms the pivot axis for the triangular guide structure formed by the cross guide member 4 and the support rod 5. Starting from the point of pivotal connection 1 which is located forwardly in the driving direction, the cross guide member 4 thereby extends obliquely toward the rear and outwardly whereas the support rod 5 extends from the further rearwardly disposed point of pivotal connection 2 obliquely toward the front and outwardly in relation to the driving direction 8 and is connected with the cross guide member 4 near the outer end thereof.

The element 6 provided in the connection is illustrated in detail in FIG. 2 whereby it can be seen from FIG. 2 that the support rod 5 with its flattened-off forward end projects into the mounting opening 9 through an opening 8 provided laterally in the cross guide member 4, in which it is connected with the cross guide member 4 by way of the connecting element 6.

The connecting element 6 includes two clamping cones 10 which are located in the mounting opening 9 clamped against one another by means of the clamping bolt 11 constructed as tight-fit bolt. The forward end of the support rod 5 which projects into the mounting opening 9 and which is disposed in a corresponding recess of the clamping cones 10 is introduced between the clamping cons 10, whereby the forward end of the support rod 5 is provided with a bore corresponding to the diameter of the clamping bolt 11.

The arrangement described hereinabove is thereby made in such a manner that the cross guide member 4 and the connecting element 6 are constructed symmetrically to a cross plane at least within the area of the connecting element, which cross plane is determined at least essentially by the longitudinal axes of the cross guide member 4 and of the support rod 5.

Corresponding to the inclination of the clamping cone 10, the mounting opening 9 is provided with mutually inclined cone surfaces 12 mutually inclined in relation to the aforementioned symmetry plane. Elastic, cone-shaped intermediate layers 13 are arranged between the conical surfaces 12 and the clamping cones 10, which in the illustrated embodiment are each radially reinforced by a cone-shaped sheet metal insert 14. The sheet metal inserts 14 are preferably vulcanized in situ between two parts of the elastic intermediate layer, and it is assured by these sheet metal inserts 14 that as large as possible a difference exists between radial spring softness and torsional rigidity.

By the use of two mutually inclined clamping cones, a centering and stabilization of the triangular guide structure formed by the cross guide member 4 and the support rod 5 into the respectively desired position is achieved in case of tensional or compressive loads, and it is assured thereby that the resulting tensional or compression force component lies in the axis of the support rod, whence bending loads acting on the support rod are avoided. The cross guide member 4 maintains its position in the triangular guide structure plane, in which are also located the pivot axis of the triangular guide structure and the outer point of pivotal connection at the wheel carrier. As a result thereof, further shock absorber contortions and seizings are avoided. A tilting of the cross guide member, i.e., a pivoting about its longitudinal axis, is also far-reachingly suppressed even without compression or tension force in the support rod by the large base, i.e., by the large base diameter of the mutually opposite clamping cones in conjunction with the conical elastic intermediate layers which are hard in compression. Such a tilting could occur only if tension or compression forces transmitted from the cross guide member 4 onto the support rod are transmitted to the support rod outside of the longitudinal axis of the cross guide member, i.e., if the point of connection between the support rod and the cross guide member is located outside of the intersection of cross guide member axis and of the support rod axis. A connection is provided by the present invention which assures such a good centering that also under the influence of tension and compression loads this position of the axes to one another can be at least far-reachingly maintained. The swinging or pivot movement of the support rod which occurs in case of a longitudinal spring movement are absorbed in an optimum manner by the double cone bearing support effective in this pivot plane as torsional bearing.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An elastic connecting element between a cross guide member and a support rod of a subdivided triangular guide means of a vehicle, the support rod being disposed to the rear of the cross guide member as viewed in the vehicle longitudinal direction, and connecting pin means including two clamping cone means and a clamping bolt, said clamping bolt extending through the clamping cone means as well as through the end portion of the support rod and clamping the clamping cone means by way of corresponding elastic intermediae members of at least approximately corresponding conical shape in a mounting aperture provided in the cross guide member and substantially shaped corresponding to the clamping cone means, the support rod projecting into said mounting aperture by way of a lateral opening provided in the cross guide member.

2. A connecting element according to claim 1, characterized in that the clamping bolt is a tight-fit bolt.

3. A connecting element according to claim 2, characterized in that the connecting pin means is disposed approximately perpendicularly to a guide plan determined by the longitudinal axes of the cross guide member and of the support rod, and in that guide plane forms a plane of symmetry for the connecting pin means and the area of the cross guide member traversed by the connecting pin means.

4. A connecting element according to claim 3, characterized in that the reduced end portion of the support rod is located between recessed ends of the clamping cone means.

5. A connecting element according to claim 4, characterized in that a respective elastic intermediate member is provided with a conically shaped sheet metal insert.

6. A connecting element according to claim 5, characterized in that the largest diameter of a clamping cone means is larger than the smallest diameter of the mounting aperture.

7. A connecting element according to claim 1, characterized in that a respective elastic intermediate number is provided with a conically shaped sheet metal insert.

8. A connecting element according to claim 1, characterized in that the largest diameter of a clamping cone means is larger than the smallest diameter of the mounting aperture.

9. A connecting element according to claim 7, characterized in that the connecting pin means is disposed approximately perpendicularly to a guide plane determined by the longitudinal axes of the cross guide member and of the support rod, and in that guide plane forms a plane of symmetry for the connecting pin means and the area of the cross guide member traversed by the connecting pin means.

10. A connecting element according to claim 1, characterized in that the clamping bolt is a tight-fit bolt.

* * * * *